(12) United States Patent
Echigo et al.

(10) Patent No.: US 11,767,586 B2
(45) Date of Patent: Sep. 26, 2023

(54) MANUFACTURING METHOD FOR ALLOY MATERIAL, ALLOY MATERIAL, ELECTROCHEMICAL ELEMENT, ELECTROCHEMICAL MODULE, ELECTROCHEMICAL DEVICE, ENERGY SYSTEM AND SOLID OXIDE FUEL CELL

(71) Applicant: Osaka Gas Co., Ltd., Osaka (JP)

(72) Inventors: Mitsuaki Echigo, Osaka (JP); Hisao Ohnishi, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 810 days.

(21) Appl. No.: 16/498,120

(22) PCT Filed: Mar. 30, 2018

(86) PCT No.: PCT/JP2018/013693
§ 371 (c)(1),
(2) Date: Sep. 26, 2019

(87) PCT Pub. No.: WO2018/181926
PCT Pub. Date: Oct. 4, 2018

(65) Prior Publication Data
US 2020/0102635 A1    Apr. 2, 2020

(30) Foreign Application Priority Data

Mar. 31, 2017   (JP) .................... 2017-073146

(51) Int. Cl.
*C23C 8/18* (2006.01)
*C22C 38/50* (2006.01)
(Continued)

(52) U.S. Cl.
CPC ................ *C23C 8/18* (2013.01); *C22C 38/50* (2013.01); *C23C 28/04* (2013.01); *C23C 28/345* (2013.01);
(Continued)

(58) Field of Classification Search
None
See application file for complete search history.

(56) References Cited

U.S. PATENT DOCUMENTS

2015/0217349 A1\* 8/2015 Iguchi .................... B21B 25/00
427/372.2
2017/0321310 A1    11/2017 Hatano et al.

FOREIGN PATENT DOCUMENTS

JP    2010250965 A    11/2010
JP    2011179063 A     9/2011
(Continued)

OTHER PUBLICATIONS

Stanislowski et al., Reduction of chromium vaporization from SOFC interconnectors by highly effective coatings, Journal of Power Sources, Jan. 20, 2007, 578-589, vol. 164, No. 2.
(Continued)

*Primary Examiner* — Daniel J. Schleis
(74) *Attorney, Agent, or Firm* — THE WEBB LAW FIRM

(57) ABSTRACT

Provided is an alloy material including a metal oxide thin layer that can be formed using a simple method at low cost and can further suppress volatilization of Cr, which causes deterioration of a fuel cell, compared with a case where conventional expensive materials are used. Disclosed is a manufacturing method for an alloy material including a coating treatment step for coating a substrate made of a Fe—Cr based alloy with Co, and an oxidation treatment step for performing oxidation treatment on the substrate in a moisture-containing atmosphere after the coating treatment step.

3 Claims, 4 Drawing Sheets

(51) Int. Cl.
  *C25D 3/12*       (2006.01)
  *C25D 5/48*       (2006.01)
  *H01M 8/1226*     (2016.01)
  *C23C 28/00*      (2006.01)
  *C23C 28/04*      (2006.01)

(52) U.S. Cl.
  CPC .............. *C25D 3/12* (2013.01); *C25D 5/48* (2013.01); *H01M 8/1226* (2013.01)

(56) References Cited

FOREIGN PATENT DOCUMENTS

| JP | 2011192546 A | 9/2011 |
| JP | 201454637 A | 3/2014 |
| JP | 2016173954 A | 9/2016 |
| JP | 2016195029 A | 11/2016 |
| WO | 2016017692 A1 | 2/2016 |

OTHER PUBLICATIONS

Zhang et al., Preparation and performances of Co—Mn spinel coating on a ferritic stainless steel interconnect material for solid oxide fuel cell application, Journal of Power Sources, Dec. 11, 2013, 122-129, vol. 252.
Lewis et al., A Process to Synthesize (MnCo)O Spinel Coatings for Protecting SOFC Interconnect Alloys, Electrochemical and Solid-State Letters, 2011, B9-B12, 14 (I).
Office Action issued in JP 2019-510267, dated Jun. 7, 2022, 6 pages.

\* cited by examiner

MANUFACTURING METHOD FOR ALLOY MATERIAL, ALLOY MATERIAL, ELECTROCHEMICAL ELEMENT, ELECTROCHEMICAL MODULE, ELECTROCHEMICAL DEVICE, ENERGY SYSTEM AND SOLID OXIDE FUEL CELL

CROSS-REFERENCE TO RELATED APPLICATIONS

This application is the United States national phase of International Application No. PCT/JP2018/013693 filed Mar. 30, 2018, and claims priority to Japanese Patent Application No. 2017-073146 filed Mar. 31, 2017, the disclosures of which are hereby incorporated by reference in their entirety.

TECHNICAL FIELD

The present invention relates to an alloy material to be used in an electrochemical device, a solid oxide fuel cell, and the like, and a manufacturing method for the alloy material.

BACKGROUND ART

A material obtained by forming a steam oxidation suppressing layer including a MnCr oxide layer and a composite oxide layer that contains Mn and Co, and the like on the surface of a Cr alloy material through application of slurry and oxidation treatment has been used as a conventional heat-resistant alloy material for a solid oxide fuel cell (Patent Document 1).

PRIOR ART DOCUMENTS

Patent Document

Patent Document 1: JP 2010-250965A

DISCLOSURE OF THE INVENTION

Problem to be Solved by the Invention

With the method for applying a complex composite oxide layer on/over an alloy material as disclosed in Patent Document 1, the manufacturing cost of the alloy material is high. In addition, there is room for improvement in suppression of volatilization of Cr.

The present invention was achieved in light of the foregoing problems, and an object of the present invention is to provide an alloy material including a metal oxide thin layer that can be formed using a simple method at low cost and can further suppress volatilization of Cr, which causes deterioration of a fuel cell, compared with a case where conventional expensive materials are used.

Means for Solving Problem

A characteristic configuration of a manufacturing method for an alloy material for achieving the object includes a coating treatment step for coating a substrate made of a Fe—Cr based alloy with Co, and an oxidation treatment step for performing oxidation treatment on the substrate in a moisture-containing atmosphere after the coating treatment step.

The above-mentioned characteristic configuration makes it possible to manufacture an alloy material having high thermal resistance at low cost. In addition, an effect of suppressing volatilization of Cr can be improved compared with conventional cases.

In another characteristic configuration of the manufacturing method for an alloy material according to the present invention, coating with Co is performed through plating treatment in the coating treatment step.

The above-mentioned characteristic configuration makes it possible to manufacture an alloy material at lower cost.

It is preferable to perform the oxidation treatment step in an atmosphere having a dew point of 25° C. or higher because an alloy material that exhibits a large effect of suppressing volatilization of Cr can be manufactured. It is more preferable to perform the oxidation treatment step in an atmosphere having a dew point of 30° C. or higher, and it is even more preferable to perform the oxidation treatment step in an atmosphere having a dew point of 35° C. or higher. The reason for this is that manufacturing an alloy material that exhibits a larger effect of suppressing volatilization of Cr is facilitated.

A characteristic configuration of an alloy material for achieving the object includes a substrate made of a Fe—Cr based alloy, and a thin layer formed on/over the substrate, wherein the thin layer contains Co, and a Co-containing region is formed in the vicinity of a surface inside the substrate.

With the above-mentioned characteristic configuration, the thin layer contains Co, and the Co-containing region is formed in the vicinity of the surface inside the substrate. An alloy material having such a configuration exhibits an improved effect of suppressing volatilization of Cr and is favorably used in an electrochemical element, an electrochemical device, a solid oxide fuel cell, or the like.

A characteristic configuration of an alloy material for achieving the object includes a substrate made of a Fe—Cr based alloy, and a thin layer formed on/over the substrate, wherein the thin layer includes a first layer and a second layer,
  the first layer is formed on/over the substrate and is made of a metal oxide that contains Cr, and
  the second layer is formed on/over the first layer as a metal oxide thin layer containing Co.

With the above-mentioned characteristic configuration, the alloy material provided with the thin layer that includes the first layer containing Cr and the second layer containing Co is formed. An alloy material having such a configuration exhibits an improved effect of suppressing volatilization of Cr and is favorably used in an electrochemical element, an electrochemical device, a solid oxide fuel cell, or the like.

A characteristic configuration of an alloy material for achieving the object includes a substrate made of a Fe—Cr based alloy, and a thin layer formed on/over the substrate, wherein the thin layer includes a first layer and a second layer,
  the first layer is formed on/over the substrate and is made of a metal oxide containing Cr,
  the second layer is formed on/over the first layer and is made of a metal oxide containing Co, and
  a Co-containing region is formed in the vicinity of a surface inside the substrate.

With the above-mentioned characteristic configuration, the thin layer includes the first layer containing Cr and the second layer containing Co, and the Co-containing region is formed in the vicinity of the surface inside the substrate. An alloy material having such a configuration exhibits an improved effect of suppressing volatilization of Cr and is favorably used in an electrochemical element, an electrochemical device, a solid oxide fuel cell, or the like.

It is more preferable that the second layer contains Mn because an alloy material that exhibits an improved effect of suppressing volatilization of Cr is formed.

It is more preferable that the Fe—Cr based alloy of the substrate contains Mn in an amount of 0.05 mass % or more because an alloy material including a thin layer that exhibits an improved effect of suppressing volatilization of Cr is easily obtained. It is even more preferable that the content of Mn is 0.1 mass % or more because an alloy material including a thin layer that exhibits an improved effect of suppressing volatilization of Cr is more easily obtained.

In another characteristic configuration of the alloy material according to the present invention, the Fe—Cr based alloy of the substrate is any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, the total content of Ti and Zr being 0.15 mass % or more and 1.0 mass % or less.

Ti and Zr are likely to form stable carbides through reaction with carbon in a steel material. With the above-mentioned characteristic configuration, a metal support is made of any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, the total content of Ti and Zr being 0.15 mass % or more and 1.0 mass % or less, and the effect of improving oxidation resistance and high-temperature strength of the Fe—Cr based alloy is thus obtained, thus making it possible to suppress volatilization of Cr from the metal support even during long periods of use at high temperatures, and making it possible to realize an electrochemical element that has excellent durability.

It should be noted that the content of Ti is preferably 0.20 mass % or more, and more preferably 0.25 mass % or more. The reason for this is that the effect of improving oxidation resistance and high-temperature strength of the Fe—Cr based alloy due to the addition of Ti or Zr can be made greater. Moreover, the content of Ti is preferably 0.90 mass % or less, and more preferably 0.80 mass % or less. The reason for this is that an increase in the cost of the Fe—Cr based alloy due to the addition of Ti or Zr can be suppressed.

It should be noted that the content of Zr is preferably 0.20 mass % or more, and more preferably 0.25 mass % or more. The reason for this is that the effect of improving oxidation resistance and high-temperature strength of the Fe—Cr based alloy due to the addition of Ti or Zr can be made greater. Moreover, the content of Zr is preferably 0.90 mass % or less, and more preferably 0.80 mass % or less. The reason for this is that an increase in the cost of the Fe—Cr based alloy due to the addition of Ti or Zr can be suppressed.

It should be noted that the total content of Ti and Zr is preferably 0.20 mass % or more, and more preferably 0.25 mass % or more. The reason for this is that the effect of improving oxidation resistance and high-temperature strength of the Fe—Cr based alloy due to the addition of Ti or Zr can be made greater. Moreover, the total content of Ti and Zr is preferably 0.90 mass % or less, and more preferably 0.80 mass % or less. The reason for this is that an increase in the cost of the Fe—Cr based alloy due to the addition of Ti or Zr can be suppressed.

In another characteristic configuration of the alloy material according to the present invention, the Fe—Cr based alloy of the substrate contains Cu in an amount of 0.10 mass % or more and 1.0 mass % or less.

Cu has an effect of reducing contact resistance (electric resistance). With the above-mentioned characteristic configuration, the metal support contains Cu in an amount of 0.10 mass % or more and 1.0 mass % or less, thus making it possible to suppress the electric resistance value of the electrochemical element to a low level, and making it possible to realize a high-performance electrochemical element.

It should be noted that the content of Cu is preferably 0.20 mass % or more, and more preferably 0.30 mass % or more. The reason for this is that the effect of reducing contact resistance due to the addition of Cu to the Fe—Cr based alloy can be made greater. Moreover, the content of Cu is preferably 0.90 mass % or less, and more preferably 0.70 mass % or less. The reason for this is that an increase in cost due to the addition of Cu to the Fe—Cr based alloy can be suppressed.

In another characteristic configuration of the alloy material according to the present invention, the Fe—Cr based alloy of the substrate contains Cr in an amount of 18 mass % or more and 25 mass % or less.

The above-mentioned characteristic configuration makes it possible to bring the thermal expansion coefficient of the Fe—Cr based alloy close to the thermal expansion coefficients of a zirconia-based material and a ceria-based material contained in the materials for forming an electrode layer and an electrolyte layer of a SOFC, for example, thus making it possible to suppress breakage and separation of the electrode layer and the electrolyte layer even in a case where the electrochemical element is used at high temperatures or a heat cycle is performed, and making it possible to realize a highly reliable electrochemical element.

It should be noted that the content of Cr is more preferably 20 mass % or more. The reason for this is that the thermal expansion coefficient of the Fe—Cr based alloy can be brought closer to the thermal expansion coefficients of the zirconia-based material and the ceria-based material. Moreover, the upper limit of the content of Cr is more preferably 23 mass % or less. The reason for this is that an increase in the cost of the Fe—Cr based alloy can be suppressed.

An electrochemical element in which at least an electrode layer, an electrolyte layer, and a counter electrode layer are provided on/over the above-described alloy material has high performance because the volatilization of Cr from the alloy material is suppressed and the alloy material functions as a metal support of the electrochemical element.

In a characteristic configuration of an electrochemical module according to the present invention, a plurality of the above-described electrochemical elements are arranged in an assembled state.

With the above-mentioned characteristic configuration, the plurality of the above-described electrochemical elements are arranged in an assembled state, thus making it possible to obtain an electrochemical module that is compact, has high performance, and has excellent strength and reliability, while also suppressing material cost and processing cost.

A characteristic configuration of an electrochemical device according to the present invention includes at least the above-described electrochemical module and a reformer, and includes a fuel supply unit which supplies fuel gas containing a reducible component to the electrochemical module.

The above-mentioned characteristic configuration includes the electrochemical module and the reformer, and includes the fuel supply unit which supplies the fuel gas containing a reducible component to the electrochemical module, thus making it possible to realize an electrochemical device that uses an existing raw fuel supply infrastructure such as city gas and includes the electrochemical module that has excellent durability, reliability, and performance. Also, it is easier to construct a system that recycles unused fuel gas discharged from the electrochemical module, thus making it possible to realize a highly efficient electrochemical device.

A characteristic configuration of an electrochemical device according to the present invention includes at least the above-described electrochemical module and an inverter that extracts electrical power from the electrochemical module.

The above-mentioned characteristic configuration is preferable because it makes it possible to boost, using an inverter, electrical output obtained from the electrochemical module that has excellent durability, reliability, and performance, or to convert a direct current into an alternating current, and thus makes it easy to use the electrical output obtained from the electrochemical module.

It is preferable that the electrochemical device includes a separator and the above-described alloy material is used for the separator because volatilization of Cr from the separator is suppressed. It should be noted that the separator separates a fuel gas passage and an air passage that supply fuel gas and air to the plurality of electrochemical elements arranged in an assembled manner.

It is preferable that the electrochemical device includes a manifold and the above-described alloy material is used for the manifold because volatilization of Cr from the manifold is suppressed. It should be noted that the manifold supplies fuel gas or air to the plurality of electrochemical elements arranged in an assembled manner.

It is preferable that the electrochemical device includes interconnectors and the above-described alloy material is used for the interconnectors because volatilization of Cr from the interconnectors is suppressed. It should be noted that the interconnectors join the plurality of electrochemical elements to each other.

It is preferable that the electrochemical device includes a current collector and the above-described alloy material is used for the current collector because volatilization of Cr from the current collector is suppressed. It should be noted that the current collector has electron conductivity and is to be connected to the electrode layer of the electrochemical element.

A characteristic configuration of an energy system according to the present invention includes the above-described electrochemical device, and a waste heat management unit that reuses heat discharged from the electrochemical device.

The above-mentioned characteristic configuration includes the electrochemical device and the waste heat management unit that reuses heat discharged from the electrochemical device, thus making it possible to realize an energy system that has excellent durability, reliability, and performance as well as excellent energy efficiency. It should be noted that it is also possible to realize a hybrid system that has excellent energy efficiency by combination with a power generation system that generates power with use of combustion heat from unused fuel gas discharged from the electrochemical device.

A characteristic configuration of a solid oxide fuel cell according to the present invention includes the above-described electrochemical element, wherein a power generation reaction is caused in the electrochemical element.

The above-mentioned characteristic configuration makes it possible to suppress deterioration of the electrochemical element and maintain the performance of the fuel cell for a long period of time. It should be noted that a solid oxide fuel cell that can be operated in a temperature range of 650° C. or higher during the rated operation is more preferable because a fuel cell system that uses hydrocarbon-based raw fuel such as city gas can be constructed such that waste heat discharged from a fuel cell can be used in place of heat required to convert raw fuel to hydrogen, and the power generation efficiency of the fuel cell system can thus be improved. A solid oxide fuel cell that is operated in a temperature range of 900° C. or lower during the rated operation is more preferable because the effect of suppressing volatilization of Cr can be maintained at a high level, and thus the long-term durability is excellent. A solid oxide fuel cell that is operated in a temperature range of 850° C. or lower during the rated operation is even more preferable because the effect of suppressing volatilization of Cr can be further improved, and thus the long-term durability is excellent.

BEST MODES FOR CARRYING OUT THE INVENTION

First Embodiment

Figure 1:
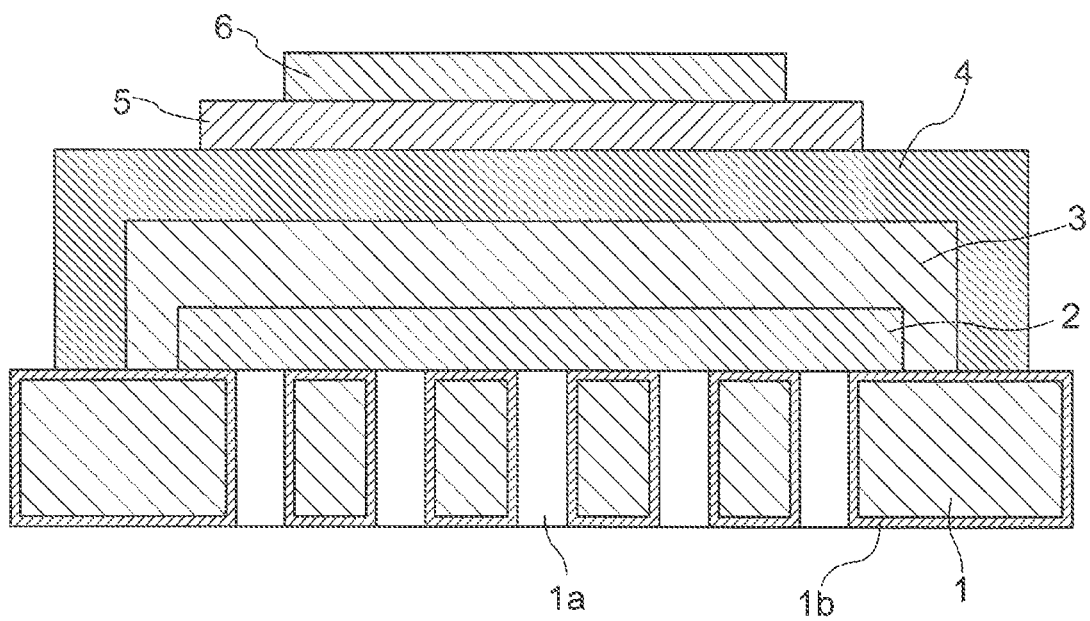
FIG. 1 is a schematic diagram showing a configuration of an electrochemical element.

Hereinafter, a manufacturing method for an alloy material according to this embodiment and an alloy material will be described. The alloy material is manufactured by coating a substrate with Co and performing oxidation treatment in an atmosphere to which water vapor has been added. In the thus-manufactured alloy material, volatilization of Cr is suppressed, and the alloy material is favorably used in an electrochemical element, an electrochemical device, a solid oxide fuel cell, and the like. For example, the alloy material is used for a metal substrate 1 (metal support) of an electrochemical element E shown in FIG. 1. For example, the alloy material is used for a U-shaped component 7 (separator) or a current collector 26 of an electrochemical module M shown in FIG. 2. For example, the alloy material is used for a gas manifold 17 (manifold) of an electrochemical device Y shown in FIG. 3.

It should be noted that the alloy material may be constituted by a substrate and a thin layer (metal oxide thin layer 1b (diffusion suppressing layer)) formed by directly coating the surface of the substrate with Co and then performing oxidation treatment. Alternatively, the alloy material may be constituted by a substrate, an interposing layer between the substrate and a thin layer, and the thin layer formed by coating the interposing layer with Co and then performing oxidation treatment.

Substrate

A Fe—Cr based alloy is used as the substrate of the alloy material. It is preferable that the Fe—Cr based alloy of the substrate contains Mn in an amount of 0.05 mass % or more. It is more preferable that the Fe—Cr based alloy of the substrate is any one of a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, and a Fe—Cr based alloy that contains Ti and Zr, the total content of Ti and Zr being 0.15 mass % or more and 1.0 mass % or less. It is more preferable that the Fe—Cr based alloy of the substrate contains Cu in an amount of 0.10 mass % or more and 1.0 mass % or less. It is more preferable that the Fe—Cr based alloy of the substrate contains Cr in an amount of 18 mass % or more and 25 mass % or less.

Manufacturing Method for Alloy Material

Next, a manufacturing method for an alloy material according to this embodiment will be described.

Coating Treatment Step

In a coating treatment step, the substrate made of a Fe—Cr alloy is coated with Co. The substrate can be coated with Co through plating treatment electrolytic plating or non-electrolytic plating), vapor deposition treatment, painting using paint containing Co, or the like.

It should be noted that, in the coating treatment step, the surface of the substrate may be directly coated with Co, or the interposing layer between the substrate and the thin layer may be coated with Co.

Oxidation Treatment Step

In an oxidation treatment step, the substrate is subjected to oxidation treatment in a moisture-containing atmosphere. The dew point of the atmosphere is preferably 25° C. or higher, more preferably 30° C. or higher, and even more preferably 35° C. or higher. The oxidation treatment is preferably performed at a temperature of 600° C. or higher, and more preferably at a temperature of 700° C. or higher. The oxidation treatment is preferably performed at a temperature of 1100° C. or lower, and more preferably at a temperature of 1050° C. or lower.

The alloy material can be manufactured as described above. It should be noted that, when the alloy material is used for the metal substrate 1, the separator, the manifold, the current collector, or the like of the electrochemical element E, it is preferable to perform machine processing such as cutting, bending, or press shape forming on the alloy material before performing the coating treatment step and the oxidation treatment step. It is also possible to perform machine processing such as cutting or bending after performing the coating treatment step and the oxidation treatment step.

Also, it is preferable to use the thus-obtained alloy material as the metal substrate 1 of the electrochemical element E because a high-performance electrochemical element E whose internal resistance is suppressed can be obtained.

WORKING EXAMPLES

Samples of the alloy material were produced using substrates having a composition shown in Table 1 below. It should be noted that the unit for the values in the composition shown in Table 1 is "mass %". The substrates were coated with Co through electrolytic plating. There were three types of thicknesses of the Co coatings, namely 1 μm, 2 μm, and 3 μm. Two conditions, namely an atmosphere having a dew point of 40° C. (working examples) and an atmosphere having a dew point of 20° C. (comparative examples), were used to perform the oxidation treatment. In all the cases, the oxidation treatment was performed at temperatures 850° C. (for 60 minutes) and 1000° C. (for 90 minutes), that is, as a two-stage treatment.

TABLE 1

| Si | 0.094 |
|---|---|
| Mn | 0.17 |
| Cu | 0.43 |
| Ni | 0.18 |
| Cr | 20.82 |
| Al | 0.04 |
| Mo | 0.053 |
| Nb | 0.008 |
| Ti | 0.325 |
| Zr | — |
| La | — |

The amount of volatilized Cr was measured for each of the six types of produced samples. Metal plate samples with a width of 25 mm and a length of 250 to 300 mm were used and exposed to air at 0.5 L/minute (dew point: 20° C. or 40° C.) at a temperature of 850° C. for 100 hours. Then, the amount (integrated amount) of Cr volatilized during that time was measured. Table 2 shows the measurement results. It should be noted that the unit for the amounts of volatilized Cr shown in Table 2 is "μg/600 cm$^2$", and the values obtained through conversion into values corresponding to the amount of Cr volatilized from a metal surface area of 600 cm$^2$ are shown.

TABLE 2

| | Coating thickness | Amount of volatilized Cr |
|---|---|---|
| Comp. Ex. | 1 μm | 310 μg |
| (oxidation treatment was | 2 μm | 544 μg |
| performed in atmosphere | 3 μm | 643 μg |
| having dew point of 20° C.) | | |
| Work. Ex. | 1 μm | 12 μg |
| (oxidation treatment was | 2 μm | smaller than or equal to detection limit |
| performed in atmosphere | | |
| having dew point of 40° C.) | 3 μm | smaller than or equal to detection limit |

In the three types of samples of the comparative examples, a certain amount of Cr volatilized. In contrast, in the three types of samples of the working examples, the amount of volatilized Cr was very small. In particular, in the two types of samples having a coating thickness of 2 μm or more, the amount of volatilized Cr was smaller than or equal to the detection limit. It was found from these results that an alloy material in which the amount of volatilized Cr is very small can be obtained using the manufacturing method for an alloy material according to this embodiment.

Figure 5:
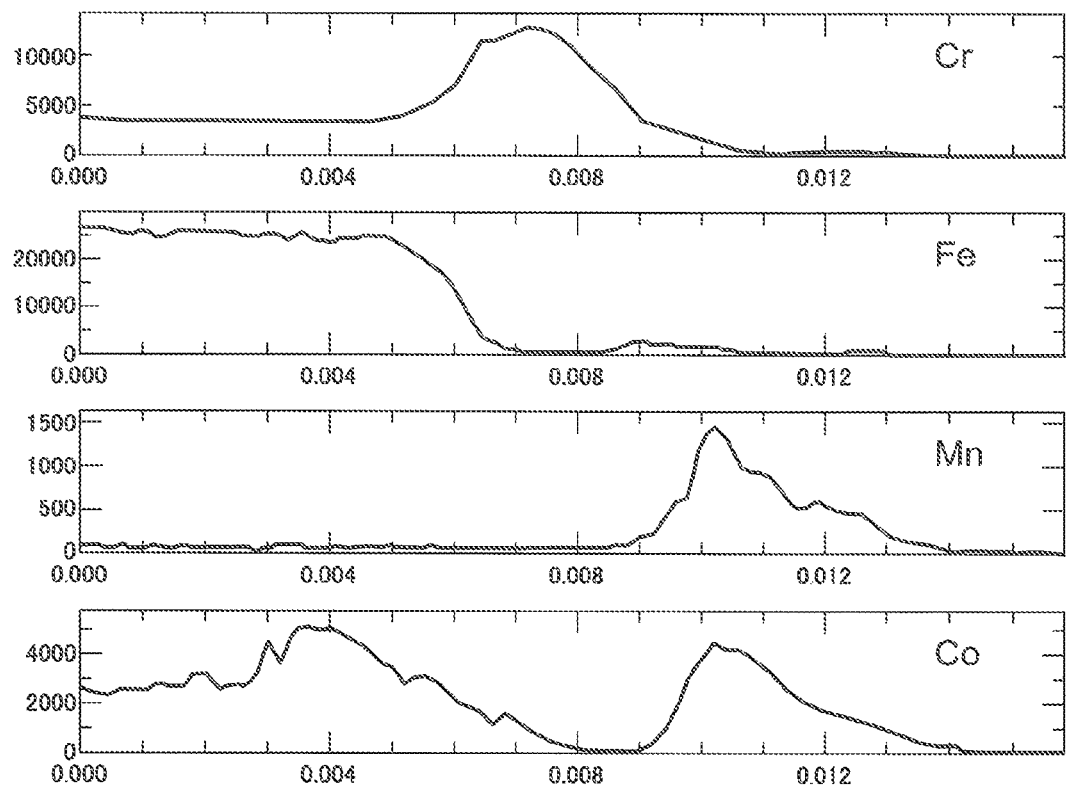
FIG. 5 shows the results of an element distribution measurement of a produced sample (working example).
Figure 6:
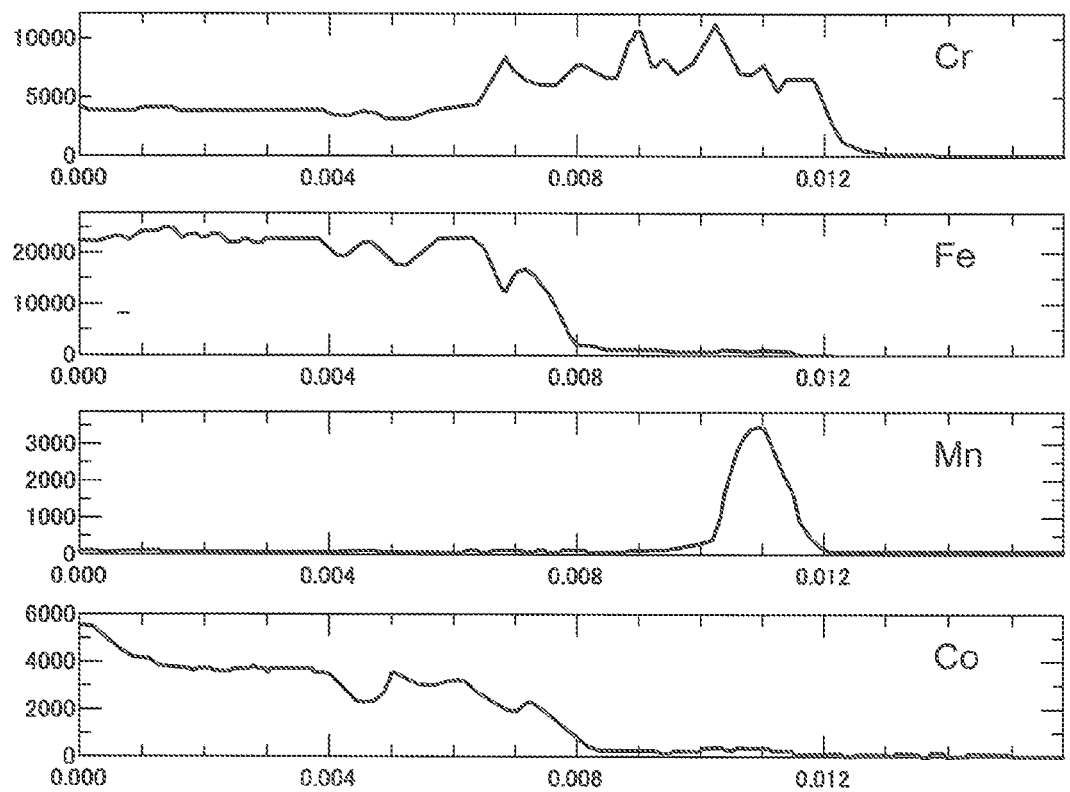
FIG. 6 shows the results of an element distribution measurement of a produced sample (comparative example).

In the produced samples of the working example and the comparative example, the element distributions (Cr, Fe, Mn, Co) in the vicinity of the surface were measured. The analyses were performed by exposing cross sections of the alloy materials and performing EPMA analysis thereon. FIGS. 5 and 6 show the results.

FIG. 5 shows the results from the working example (the oxidation treatment was performed in the atmosphere having a dew point of 40° C., and the coating thickness was 3 μm). The horizontal axis indicates positions (unit: mm) in the direction orthogonal to the surface of the substrate. The rightward direction (positive direction) is a direction toward the surface of the substrate, and the leftward direction (negative direction) is a direction toward the inside of the substrate. The vertical axis indicates the signal intensity of each element, which is a relative value, and thus the distribution ratio between the elements is not reflected.

Focusing on the distribution of Fe, the signal intensity was high between position 0 to position 0.005, the signal intensity decreased in the vicinity of a position between position 0.005 to position 0.006, and the signal intensity was substantially zero from position 0.007 onward. Accordingly, it was estimated that the vicinity of a portion between position 0 to position 0.006 corresponded to the substrate (alloy), and a portion on the right side (surface side) of position 0.006 corresponded to the thin layer.

A large amount of Cr was distributed between position 0.006 to position 0.009. Accordingly, it was estimated that Cr was distributed in a region of the thin layer near the substrate. A large amount of Mn was distributed between position 0.009 to position 0.013. Accordingly, it was estimated that a large amount of Mn was distributed in a region of the thin layer that was far from the substrate and in which a small amount of Cr was distributed. A large amount of Co was distributed between position 0.003 and position 0.006, and between position 0.009 and position 0.013. Accordingly, it was estimated that Co was distributed in two regions. One was a region inside the substrate that was located in the vicinity of the interface between the substrate and the thin layer, that is, in the vicinity of the surface of the substrate. The other was a region of the thin layer that was far from the substrate and in which a small amount of Cr was distributed, that is, the same region as in the case of Mn.

It was confirmed from the above-described results of the element distributions that the thin layer was formed in the vicinity of the surface of the substrate in the alloy material according to this embodiment. The thin layer was formed on/over the substrate (formed above the substrate, formed to be in contact with the substrate, or formed near the substrate), and included a first layer and a second layer formed on/over the first layer (formed above the first layer, formed to be in contact with the first layer, or formed near the first layer). The first layer contained a large amount of Cr. The second layer contained a large amount of Co and a large amount of Mn. A region (Co-containing region) that contained Co was formed in the vicinity of the surface inside the substrate.

FIG. 6 shows the results from the comparative example (the oxidation treatment was performed in the atmosphere having a dew point of 20° C., and the coating thickness was 3 μm).

Focusing on the distribution of Fe, the signal intensity was high between position 0 to position 0.006, the signal intensity decreased in the vicinity of a position between position 0.006 to position 0.008, and the signal intensity was substantially zero from position 0.008 onward. Accordingly, it was estimated that the vicinity of a portion between position 0 to position 0.008 corresponded to the substrate (alloy), and a portion on the right side (surface side) of position 0.008 corresponded to the thin layer.

A large amount of Cr was distributed between position 0.007 to position 0.012. Accordingly, it was estimated that Cr was widely distributed in the thin layer region. A large amount of Mn was distributed between position 0.010 to position 0.012. Accordingly, it was estimated that a large amount of Mn was distributed in a region of the thin layer that was far from the substrate. Unlike the case of the working example shown in FIG. 5, the region in which Mn was distributed and the region in which Cr was distributed overlapped each other. A large amount of Co was distributed between position 0 and position 0.008. Unlike the case of the working example shown in FIG. 5, it was estimated that Co was distributed inside the substrate.

As shown in FIG. 6, Cr was distributed in the entire thin layer in the comparative example. On the other hand, in the case of the working example shown in FIG. 5, a large amount of Mn and a large amount of Co were distributed in the vicinity of the surface of the thin layer, but a small amount of Cr was distributed therein. It is thought that such a configuration makes it possible to significantly reduce the amount of volatilized Cr.

Second Embodiment

Hereinafter, an electrochemical element E and a solid oxide fuel cell (SOFC) according to this embodiment will be described with reference to FIG. 1. The electrochemical element E is used as a constituent element of a solid oxide fuel cell that receives a supply of air and fuel gas containing hydrogen and generates power, for example. It should be noted that when the positional relationship between layers and the like are described in the description below, a counter electrode layer 6 side may be referred to as "upper portion" or "upper side", and an electrode layer 2 side may be referred to as "lower portion" or "lower side", with respect to an electrolyte layer 4, for example. In addition, in a metal substrate 1, a surface on/over which the electrode layer 2 is formed may be referred to as "front side", and a surface on an opposite side may be referred to as "back side".

Electrochemical Element

As shown in FIG. 1, the electrochemical element E includes a metal substrate 1 (metal support), an electrode layer 2 formed on/over the metal substrate 1, an intermediate layer 3 formed on/over the electrode layer 2, and an electrolyte layer 4 formed on/over the intermediate layer 3. The electrochemical element E further includes a reaction preventing layer 5 formed on/over the electrolyte layer 4, and a counter electrode layer 6 formed on/over the reaction preventing layer 5. Specifically, the counter electrode layer 6 is formed above the electrolyte layer 4, and the reaction preventing layer 5 is formed between the electrolyte layer 4 and the counter electrode layer 6. The electrode layer 2 is porous, and the electrolyte layer 4 is dense.

Metal Substrate

The metal substrate 1 plays a role as a support that supports the electrode layer 2, the intermediate layer 3, the electrolyte layer 4, and the like and maintains the strength of the electrochemical element E. In this embodiment, the above-described alloy material is used as the metal substrate 1. It should be noted that although a plate-shaped metal substrate 1 is used as the metal support in this embodiment, a metal support having another shape such as a box shape or cylindrical shape can also be used.

It should be noted that the metal substrate 1 need only have a strength sufficient for serving as the support for forming the electrochemical element, and can have a thickness of approximately 0.1 mm to 2 mm, preferably approximately 0.1 mm to 1 mm, and more preferably approximately 0.1 mm to 0.5 mm, for example.

The metal substrate 1 is provided with a plurality of through holes 1a that penetrate the surface on the front side and the surface on the back side. It should be noted that the through holes 1a can be provided in the metal substrate 1 through mechanical, chemical, or optical piercing processing, for example. The through holes 1a have a function of transmitting gas from the surface on the back side of the metal substrate 1 to the surface on the front side thereof. Porous metal can also be used to impart gas permeability to the metal substrate 1. A metal sintered body, a metal foam, or the like can also be used as the metal substrate 1, for example.

When a ferrite-based stainless steel material is used as a material of the substrate of the metal substrate 1, its thermal expansion coefficient is close to that of YSZ (yttria-stabilized zirconia), GDC (gadolinium-doped ceria; also called CGO), or the like, which is used as the material for forming the electrode layer 2 and the electrolyte layer 4. Accordingly, even if low and high temperature cycling is repeated, the electrochemical element E is not likely to be damaged. Therefore, this is preferable due to being able to realize an electrochemical element E that has excellent long-term durability.

Electrode Layer

As shown in FIG. 1, the electrode layer 2 can be provided as a thin layer in a region that is larger than the region provided with the through holes 1*a*, on/over the front surface of the metal substrate 1. When it is provided as a thin layer, the thickness can be set to approximately 1 µm to 100 µm, and preferably 5 µm to 50 µm, for example. This thickness makes it possible to ensure sufficient electrode performance while also achieving cost reduction by reducing the used amount of expensive electrode layer material. The region provided with the through holes 1*a* is entirely covered with the electrode layer 2. That is, the through holes 1*a* are formed inside the region of the metal substrate 1 in which the electrode layer 2 is formed. In other words, all the through holes 1*a* are provided facing the electrode layer 2.

A composite material such as NiO-GDC, Ni-GDC, NiO-YSZ, Ni-YSZ, CuO—$CeO_2$, or Cu—$CeO_2$ can be used as the material for forming the electrode layer 2, for example. In these examples, GDC, YSZ, and $CeO_2$ can be called the aggregate of the composite material. It should be noted that it is preferable to form the electrode layer 2 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 2 is obtained without using heating in a high temperature range of higher than 1100° C., for example. Therefore, this is preferable due to being able to prevent damage to the metal substrate 1, suppress element interdiffusion between the metal substrate 1 and the electrode layer 2, and realize an electrochemical element that has excellent durability. Furthermore, using low-temperature heating makes it possible to facilitate handling of raw materials and is thus more preferable.

The inside and the surface of the electrode layer 2 are provided with a plurality of pores in order to impart gas permeability to the electrode layer 2.

That is, the electrode layer 2 is formed as a porous layer. The electrode layer 2 is formed to have a denseness of 30% or more and less than 80%, for example. Regarding the size of the pores, a size suitable for smooth progress of an electrochemical reaction can be selected as appropriate. It should be noted that the "denseness" is a ratio of the material of the layer to the space and can be represented by a formula "1—porosity", and is equivalent to relative density.

Intermediate Layer

As shown in FIG. 1, the intermediate layer 3 can be formed as a thin layer on/over the electrode layer 2 so as to cover the electrode layer 2. When it is formed as a thin layer, the thickness can be set to approximately 1 µm to 100 µm, preferably approximately 2 µm to 50 µm, and more preferably approximately 4 µm to 25 µm, for example. This thickness makes it possible to ensure sufficient performance while also achieving cost reduction by reducing the used amount of expensive intermediate layer material. YSZ (yttria-stabilized zirconia), SSZ (scandium-stabilized zirconia), GDC (gadolinium-doped ceria), YDC (yttrium-doped ceria), SDC (samarium-doped ceria), or the like can be used as the material for forming the intermediate layer 3. In particular, ceria-based ceramics are favorably used.

It is preferable to form the intermediate layer 3 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 3 is obtained without using heating in a high temperature range of higher than 1100° C., for example. Therefore, it is possible to prevent damage to the metal substrate 1, suppress element interdiffusion between the metal substrate 1 and the electrode layer 2, and realize an electrochemical element E that has excellent durability. Furthermore, using low-temperature heating makes it possible to facilitate handling of raw materials and is thus more preferable.

It is preferable that the intermediate layer 3 has oxygen ion (oxide ion) conductivity. It is more preferable that the intermediate layer 3 has both oxygen ion (oxide ion) conductivity and electron conductivity, namely mixed conductivity. The intermediate layer 3 that has these properties is suitable for application to the electrochemical element E.

Electrolyte Layer

As shown in FIG. 1, the electrolyte layer 4 is formed as a thin layer on/over the intermediate layer 3 so as to cover the electrode layer 2 and the intermediate layer 3. The electrolyte layer 4 can also be formed as a thin film having a thickness of 10 µm or less. Specifically, as shown in FIG. 1, the electrolyte layer 4 is provided on/over both the intermediate layer 3 and the metal substrate 1 (spanning the intermediate layer 3 and the metal substrate 1). Configuring the electrolyte layer 4 in this manner and joining the electrolyte layer 4 to the metal substrate 1 make it possible to allow the electrochemical element to have excellent toughness as a whole.

Also, as shown in FIG. 1, the electrolyte layer 4 is provided in a region that is larger than the region provided with the through holes 1*a*, on/over the front surface of the metal substrate 1. That is, the through holes 1*a* are formed inside the region of the metal substrate 1 in which the electrolyte layer 4 is formed.

The leakage of gas from the electrode layer 2 and the intermediate layer 3 can be suppressed in the vicinity of the electrolyte layer 4. A description of this will be given. When the electrochemical element E is used as a constituent element of a SOFC, gas is supplied from the back side of the metal substrate 1 through the through holes 1a to the electrode layer 2 during the operation of the SOFC. In a region where the electrolyte layer 4 is in contact with the metal substrate 1, leakage of gas can be suppressed without providing another component such as a gasket. It should be noted that although the entire vicinity of the electrode layer 2 is covered with the electrolyte layer 4 in this embodiment, a configuration in which the electrolyte layer 4 is provided on/over the electrode layer 2 and the intermediate layer 3 and a gasket or the like is provided in its vicinity may also be adopted.

YSZ (yttria-stabilized zirconia), SSZ (scandium-stabilized zirconia), GDC (gadolinium-doped ceria), YDC (yttrium-doped ceria), SDC (samarium-doped ceria), LSGM (strontium- and magnesium-doped lanthanum gallate), or the like can be used as the material for forming the electrolyte layer 4. In particular, zirconia-based ceramics are favorably used. Using zirconia-based ceramics for the electrolyte layer 4 makes it possible to increase the operation temperature of the SOFC in which the electrochemical element E is used compared with the case where ceria-based ceramics are used. For example, when the electrochemical element E is used in the SOFC, by adopting a system configuration in which a material such as YSZ that can exhibit high electrolyte performance even in a high temperature range of approximately 650° C. or higher is used as the material for forming the electrolyte layer 4, a hydrocarbon-based raw fuel material such as city gas or LPG is used as the raw fuel for the system, and the raw fuel material is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 4 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an electrolyte layer 4 that is dense and has high gas-tightness and gas barrier properties is obtained without using heating in a high temperature range of higher than 1100° C., for example. Therefore, it is possible to prevent damage to the metal substrate 1, suppress element interdiffusion between the metal substrate 1 and the electrode layer 2, and realize an electrochemical element E that has excellent performance and durability. In particular, using low-temperature heating, a spray coating technique, or the like makes it possible to realize a low-cost element and is thus preferable. Furthermore, using a spray coating technique makes it easy to obtain, in a low temperature range, an electrolyte layer that is dense and has high gas-tightness and gas barrier properties, and is thus more preferable.

The electrolyte layer 4 is given a dense configuration in order to block gas leakage of anode gas and cathode gas and exhibit high ion conductivity. The electrolyte layer 4 preferably has a denseness of 90% or more, more preferably 95% or more, and even more preferably 98% or more. When the electrolyte layer 4 is formed as a uniform layer, the denseness is preferably 95% or more, and more preferably 98% or more. When the electrolyte layer 4 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer

The reaction preventing layer 5 can be formed as a thin layer on/over the electrolyte layer 4. When it is formed as a thin layer, the thickness can be set to approximately 1 µm to 100 µm, preferably approximately 2 µm to 50 µm, and more preferably approximately 4 µm to 25 µm, for example. This thickness makes it possible to ensure sufficient performance while also achieving cost reduction by reducing the used amount of expensive reaction preventing layer material. The material for forming the reaction preventing layer 5 need only be capable of preventing reactions between the component of the electrolyte layer 4 and the component of the counter electrode layer 6. For example, a ceria-based material or the like is used. Introducing the reaction preventing layer 5 between the electrolyte layer 4 and the counter electrode layer 6 effectively suppresses reactions between the material constituting the counter electrode layer 6 and the material constituting the electrolyte layer 4 and makes it possible to improve long-term stability in the performance of the electrochemical element E. Forming the reaction preventing layer 5 using, as appropriate, a method through which the reaction preventing layer 5 can be formed at a treatment temperature of 1100° C. or lower makes it possible to suppress damage to the metal substrate 1, suppress element interdiffusion between the metal substrate 1 and the electrode layer 2, and realize an electrochemical element E that has excellent performance and durability, and is thus preferable. For example, the reaction preventing layer 5 can be formed using, as appropriate, low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature heating, a spray coating technique, or the like makes it possible to realize a low-cost element and is thus preferable. Furthermore, using low-temperature heating makes it possible to facilitate handling of raw materials and is thus more preferable.

Counter Electrode Layer

The counter electrode layer 6 can be formed as a thin layer on/over the electrolyte layer 4 or the reaction preventing layer 5. When it is formed as a thin layer, the thickness can be set to approximately 1 µm to 100 µm, and preferably approximately 5 µm to 50 µm, for example. This thickness makes it possible to ensure sufficient electrode performance while also achieving cost reduction by reducing the used amount of expensive counter electrode layer material. A complex oxide such as LSCF or LSM, or a ceria-based oxide, or a mixture thereof can be used as the material for forming the counter electrode layer 6, for example. In particular, it is preferable that the counter electrode layer 6 includes a perovskite oxide containing two or more elements selected from the group consisting of La, Sr, Sm, Mn, Co, and Fe. The counter electrode layer 6 constituted by the above-mentioned material functions as a cathode.

It should be noted that forming the counter electrode layer 6 using, as appropriate, a method through which the counter electrode layer 6 can be formed at a treatment temperature of 1100° C. or lower makes it possible to suppress damage to the metal substrate 1, suppress element interdiffusion between the metal substrate 1 and the electrode layer 2, and realize an electrochemical element E that has excellent performance and durability, and is thus preferable. For example, the counter electrode layer 6 can be formed using, as appropriate, low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature heating, a spray coating technique, or the like makes it possible to realize a low-cost element and is thus preferable. Furthermore, using low-temperature heating makes it possible to facilitate handling of raw materials and is thus more preferable.

Solid Oxide Fuel Cell

The electrochemical element E configured as described above can be used as a power generating cell for a solid oxide fuel cell. For example, fuel gas containing hydrogen is supplied from the back surface of the metal substrate 1 through the through holes 1a to the electrode layer 2, air is supplied to the counter electrode layer 6 serving as a counter electrode of the electrode layer 2, and the operation is performed at a temperature of 600° C. or higher and 850° C. or lower, for example. Accordingly, the oxygen $O_2$ included in air reacts with electrons $e^-$ in the counter electrode layer 6, thus producing oxygen ions $O^{2-}$. The oxygen ions $O^{2-}$ move through the electrolyte layer 4 to the electrode layer 2. In the electrode layer 2, the hydrogen $H_2$ included in the supplied fuel gas reacts with the oxygen ions $O^{2-}$, thus producing water $H_2O$ and electrons $e^-$. With these reactions, electromotive force is generated between the electrode layer 2 and the counter electrode layer 6. In this case, the electrode layer 2 functions as a fuel electrode (anode) of the SOFC, and the counter electrode layer 6 functions as an air electrode (cathode).

Manufacturing Method for Electrochemical Element

Next, a manufacturing method for the electrochemical element E according to this embodiment will be described.

Electrode Layer Forming Step

In an electrode layer forming step, the electrode layer 2 is formed as a thin film in a region that is broader than the region provided with the through holes 1a, on/over the front surface of the metal substrate 1. The through holes of the metal substrate 1 can be provided through laser processing or the like. As described above, the electrode layer 2 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

The following is an example of the case where low-temperature heating is performed as the electrode layer forming step. First, a material paste is produced by mixing powder of the material for forming the electrode layer 2 and a solvent (dispersion medium), and is applied to the front surface of the metal substrate 1. Then, the electrode layer 2 is obtained through compression shape forming (electrode layer smoothing step) and heating at a temperature of 1100° C. or lower (electrode layer heating step). Examples of compression shape forming of the electrode layer 2 include CIP (Cold Isostatic Pressing) shape forming, roll pressing shape forming, and RIP (Rubber Isostatic Pressing) shape forming. It is favorable to perform heating of the electrode layer 2 at a temperature of 800° C. or higher and 1100° C. or lower. The order in which the electrode layer smoothing step and the electrode layer heating step are performed can be changed.

It should be noted that, when an electrochemical element including an intermediate layer is formed, the electrode layer smoothing step and the electrode layer heating step may be omitted, and an intermediate layer smoothing step and an intermediate layer heating step, which will be described later, may include the electrode layer smoothing step and the electrode layer heating step.

It should be noted that lapping shape forming, leveling treatment, surface cutting treatment, surface polishing treatment, or the like can also be performed as the electrode layer smoothing step.

Diffusion Suppressing Layer Forming Step

The metal oxide thin layer 1b (diffusion suppressing layer (thin layer)) is formed on/over the surface of the metal substrate 1 during the heating step in the above-described electrode layer forming step. It should be noted that it is preferable that the above-mentioned heating step includes a heating step in which the heating atmosphere satisfies the atmospheric condition that the oxygen partial pressure is low because a high-quality metal oxide thin layer 1b (diffusion suppressing layer) that has a high element interdiffusion suppressing effect and has a low resistance value is formed. In a case where a coating method that does not include heating is performed as the electrode layer forming step, for example, a separate diffusion suppressing layer forming step may also be included. For example, in the separate diffusion suppressing layer forming step, the metal oxide thin layer 1b (diffusion suppressing layer (thin layer)) is formed by coating the metal substrate 1 with Co and then performing oxidation treatment. Alternatively, for example, in the separate diffusion suppressing layer forming step, the metal oxide thin layer 1b (diffusion suppressing layer (thin layer)) is formed by coating the interposing layer formed on/over the metal substrate 1 with Co and then performing oxidation treatment.

In any case, it is desirable to perform these steps at a temperature of 1100° C. or lower such that damage to the metal substrate 1 can be suppressed. The metal oxide thin layer 1b (diffusion suppressing layer) may be formed on/over the surface of the metal substrate 1 during the heating step in an intermediate layer forming step, which will be described later.

Intermediate Layer Forming Step

In an intermediate layer forming step, the intermediate layer 3 is formed as a thin layer on/over the electrode layer 2 so as to cover the electrode layer 2. As described above, the intermediate layer 3 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

The following is an example of the case where low-temperature heating is performed as the intermediate layer forming step. First, a material paste is produced by mixing powder of the material for forming the intermediate layer 3 and a solvent (dispersion medium), and is applied to the front surface of the metal substrate 1. Then, the intermediate layer 3 is obtained through compression shape forming (intermediate layer smoothing step) and heating at a temperature of 1100° C. or lower (intermediate layer heating step). Examples of rolling of the intermediate layer 3 include CIP (Cold Isostatic Pressing) shape forming, roll pressing shape forming, and RIP (Rubber Isostatic Pressing) shape forming. It is favorable to perform heating of the intermediate layer at a temperature of 800° C. or higher and 1100° C. or lower. The reason for this is that this temperature makes it possible to form an intermediate layer 3 that has high strength while suppressing damage to and deterioration of the metal substrate 1. It is more preferable to perform heating of the intermediate layer 3 at a temperature of 1050° C. or lower, and more preferably 1000° C. or lower. The reason for this is that the lower the heating temperature of the intermediate layer 3 is, the more likely it is to further suppress damage to and deterioration of the metal substrate 1 when forming the electrochemical element E. The order in which the intermediate layer smoothing step and the intermediate layer heating step are performed can be changed.

It should be noted that lapping shape forming, leveling treatment, surface cutting treatment, surface polishing treatment, or the like can also be performed as the intermediate layer smoothing step.

Electrolyte Layer Forming Step

In an electrolyte layer forming step, the electrolyte layer 4 is formed as a thin layer on/over the intermediate layer 3 so as to cover the electrode layer 2 and the intermediate layer 3. The electrolyte layer 4 may also be formed as a thin film having a thickness of 10 μm or less. As described above, the electrolyte layer 4 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

It is desirable to perform a spray coating technique as the electrolyte layer forming step in order to form a high-quality electrolyte layer 4 that is dense and has high gas-tightness and gas barrier properties in a temperature range of 1100° C. or lower. In this case, the material for forming the electrolyte layer 4 is sprayed onto the intermediate layer 3 on/over the metal substrate 1, and the electrolyte layer 4 is thus formed.

Reaction Preventing Layer Forming Step

In a reaction preventing layer forming step, the reaction preventing layer 5 is formed as a thin layer on/over the electrolyte layer 4. As described above, the reaction preventing layer 5 can be formed using low-temperature heating, a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1. It should be noted that leveling treatment, surface cutting treatment, or surface polishing treatment may be performed after the formation of the reaction preventing layer 5, or pressing processing may be performed after wet formation and before heating in order to flatten the upper surface of the reaction preventing layer 5.

Counter Electrode Layer Forming Step

In a counter electrode layer forming step, the counter electrode layer 6 is formed as a thin layer on/over the reaction preventing layer 5. As described above, the counter electrode layer 6 can be formed using low-temperature heating, a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

In this manner, the electrochemical element E can be manufactured. It should be noted that the substrate with an electrode layer B for a metal-supported electrochemical element can be manufactured by performing the above-described electrode layer forming step and intermediate layer forming step. That is, the manufacturing method according to this embodiment is a method for manufacturing a substrate with an electrode layer B for a metal-supported electrochemical element, the substrate including a metal substrate 1 (metal support), an electrode layer 2 formed on/over the metal substrate 1, and an intermediate layer 3 formed on/over the electrode layer 2, and the method includes an intermediate layer smoothing step of smoothing the surface of the intermediate layer 3 and an intermediate layer heating step of performing heating of the intermediate layer 3 at a temperature of 1100° C. or lower.

It should be noted that a configuration in which the electrochemical element E does not include both or either of the intermediate layer 3 and the reaction preventing layer 5 is also possible. That is, a configuration in which the electrode layer 2 and the electrolyte layer 4 are in contact with each other, or a configuration in which the electrolyte layer 4 and the counter electrode layer 6 are in contact with each other is also possible. In this case, in the above-described manufacturing method, the intermediate layer forming step and the reaction preventing layer forming step are omitted. It should be noted that it is also possible to add a step of forming another layer or to form a plurality of layers of the same type one on/over top of another, but in any case, it is desirable to perform these steps at a temperature of 1100° C. or lower.

Third Embodiment

An electrochemical element E, an electrochemical module M, an electrochemical device Y, and an energy system Z according to this embodiment will be described with reference to FIGS. 2 and 3.

Figure 2:
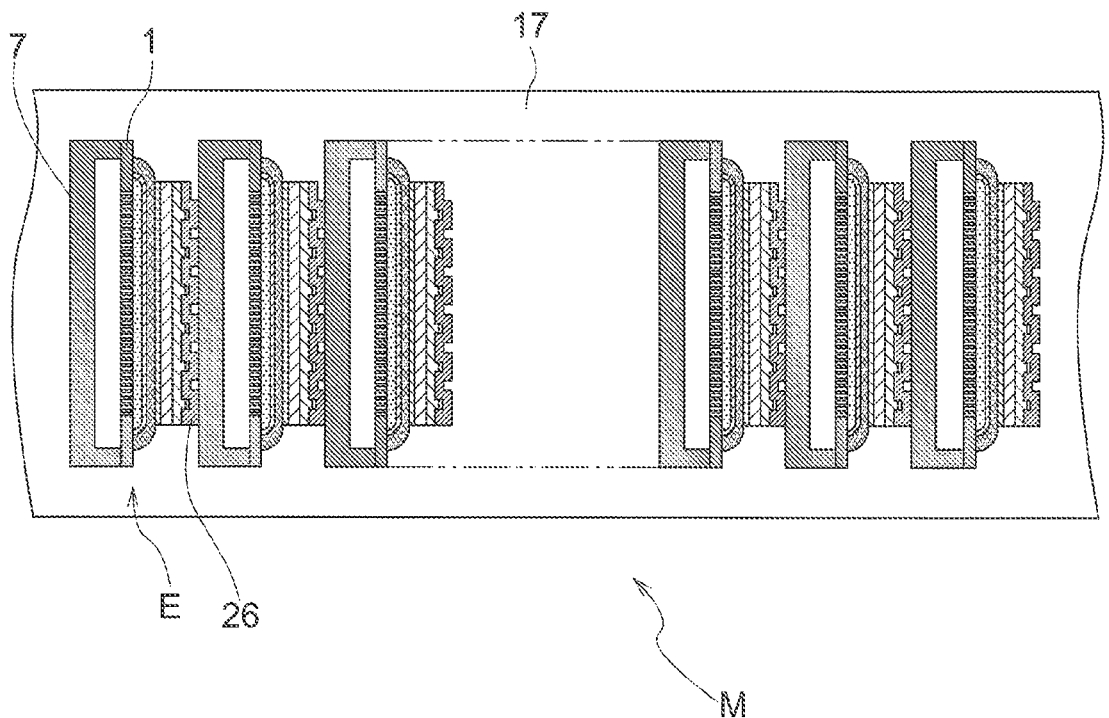
FIG. 2 is a schematic diagram showing configurations of electrochemical elements and an electrochemical module.

As shown in FIG. 2, in the electrochemical element E according to this embodiment, a U-shaped component 7 is attached to the back surface of the metal substrate 1, and the metal substrate 1 and the U-shaped component 7 form a tubular support. The above-described alloy material is used for the U-shaped component 7 (separator).

The electrochemical module M is configured by stacking a plurality of electrochemical elements E with current collectors 26 being sandwiched therebetween. Each of the current collector 26 is joined to the counter electrode layer 6 of the electrochemical element E and the U-shaped component 7, and electrically connects them. The above-described alloy material is used for the current collector 26.

The electrochemical module M includes a gas manifold 17, the current collectors 26, a terminal component, and a current extracting unit. One open end of each tubular support in the stack of the plurality of electrochemical elements E is connected to the gas manifold 17, and gas is supplied from the gas manifold 17 to the electrochemical elements E. The supplied gas flows inside the tubular supports, and is supplied to the electrode layers 2 through the through holes 1a of the metal substrates 1. The above-described alloy material is used for the gas manifold 17 (manifold).

It should be noted that the above-described alloy material may be used for at least one of the separator (U-shaped component 7), the manifold (gas manifold 17), and the current collector 26.

Figure 3:
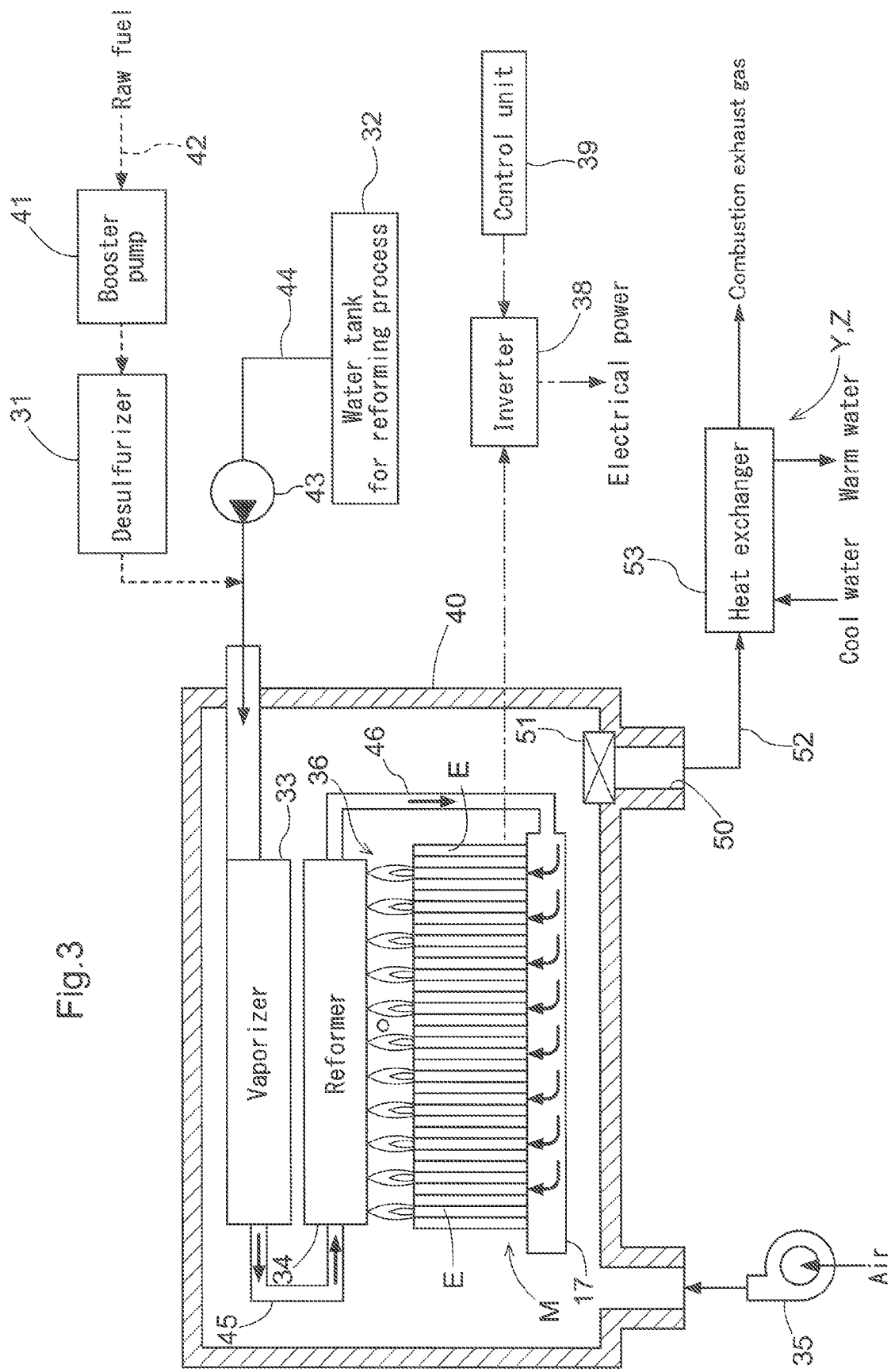
FIG. 3 is a schematic diagram showing configurations of an electrochemical device and an energy system.

FIG. 3 shows an overview of the energy system Z and the electrochemical device Y.

The energy system Z includes the electrochemical device Y, and a heat exchanger 53 serving as a waste heat management unit that reuses heat discharged from the electrochemical device Y.

The electrochemical device Y includes the electrochemical module M, and a fuel supply unit that includes a desulfurizer 31, and a reformer 34 and supplies fuel gas containing a reducible component to the electrochemical module M, and the electrochemical device Y includes an inverter 38 that extracts electrical power from the electrochemical module M.

Specifically, the electrochemical device Y includes the desulfurizer 31, a reformed water tank (water tank for reforming process) 32, a vaporizer 33, the reformer 34, a blower 35, a combustion unit 36, the inverter 38, a control unit 39, a storage container 40, and the electrochemical module M.

The desulfurizer 31 removes sulfur compound components contained in a hydrocarbon-based raw fuel such as city gas (i.e., performs desulfurization). When a sulfur compound is contained in the raw fuel, the inclusion of the desulfurizer 31 makes it possible to suppress the influence that the sulfur compound has on the reformer 34 or the electrochemical elements E. The vaporizer 33 produces water vapor from reformed water supplied from the reformed water tank 32. The reformer 34 uses the water vapor produced by the vaporizer 33 to perform steam reforming of the raw fuel desulfurized by the desulfurizer 31, thus producing reformed gas containing hydrogen.

The electrochemical module M generates electricity by causing an electrochemical reaction to occur with use of the reformed gas supplied from the reformer 34 and air supplied from the blower 35. The combustion unit 36 mixes the reaction exhaust gas discharged from the electrochemical module M with air, and burns combustible components in the reaction exhaust gas.

The electrochemical module M includes a plurality of electrochemical elements E and the gas manifold 17. The electrochemical elements E are arranged side-by-side and electrically connected to each other, and one end portion (lower end portion) of each of the electrochemical elements E is fixed to the gas manifold 17. The electrochemical elements E generate electricity by causing an electrochemical reaction to occur between the reformed gas supplied via the gas manifold 17 and air supplied from the blower 35.

The inverter 38 adjusts the electrical power output from the electrochemical module M to obtain the same voltage and frequency as electrical power received from a commercial system (not shown). The control unit 39 controls the operation of the electrochemical device Y and the energy system Z.

The vaporizer 33, the reformer 34, the electrochemical module M, and the combustion unit 36 are stored in the storage container 40. The reformer 34 performs reformation processing on the raw fuel with use of combustion heat produced by the combustion of reaction exhaust gas in the combustion unit 36.

The raw fuel is supplied to the desulfurizer 31 via a raw fuel supply passage 42, due to operation of a booster pump 41. The reformed water in the reformed water tank 32 is supplied to the vaporizer 33 via a reformed water supply passage 44, due to operation of a reformed water pump 43. The raw fuel supply passage 42 merges with the reformed water supply passage 44 at a location on the downstream side of the desulfurizer 31, and the reformed water and the raw fuel, which have been merged outside of the storage container 40, are supplied to the vaporizer 33 provided in the storage container 40.

The reformed water is vaporized by the vaporizer 33 to produce water vapor. The raw fuel, which contains the water vapor produced by the vaporizer 33, is supplied to the reformer 34 via a vapor-containing raw fuel supply passage 45. In the reformer 34, the raw fuel is subjected to steam reforming, thus producing reformed gas that includes hydrogen gas as a main component (first gas including a reducible component). The reformed gas produced in the reformer 34 is supplied to the gas manifold 17 of the electrochemical module M via a reformed gas supply passage 46.

The reformed gas supplied to the gas manifold 17 is distributed among the electrochemical elements E, and is supplied to the electrochemical elements E from the lower ends, which are the connection portions where the electrochemical elements E and the gas manifold 17 are connected to each other. Mainly the hydrogen (reducible component) in the reformed gas is used in the electrochemical reaction in the electrochemical elements E. The reaction exhaust gas, which contains remaining hydrogen gas not used in the reaction, is discharged from the upper ends of the electrochemical elements E to the combustion unit 36.

The reaction exhaust gas is burned in the combustion unit 36, and combustion exhaust gas is discharged from a combustion exhaust gas outlet 50 to the outside of the storage container 40. A combustion catalyst unit 51 (e.g., a platinum-based catalyst) is provided in the combustion exhaust gas outlet 50, and reducible components such as carbon monoxide and hydrogen contained in the combustion exhaust gas are removed by combustion. The combustion exhaust gas discharged from the combustion exhaust gas outlet 50 is sent to the heat exchanger 53 via a combustion exhaust gas discharge passage 52.

The heat exchanger 53 uses supplied cool water to perform heat exchange on the combustion exhaust gas produced by combustion in the combustion unit 36, thus producing warm water. In other words, the heat exchanger 53 operates as a waste heat management unit that reuses heat discharged from the electrochemical device Y.

It should be noted that instead of the waste heat management unit, it is possible to provide a reaction exhaust gas using unit that uses the reaction exhaust gas that is discharged from (not burned in) the electrochemical module M. The reaction exhaust gas contains remaining hydrogen gas that was not used in the reaction in the electrochemical elements E. In the reaction exhaust gas using unit, the remaining hydrogen gas is used to achieve effective energy utilization by heat utilization through combustion, power generation in a fuel cell, or the like.

Fourth Embodiment

Figure 4:
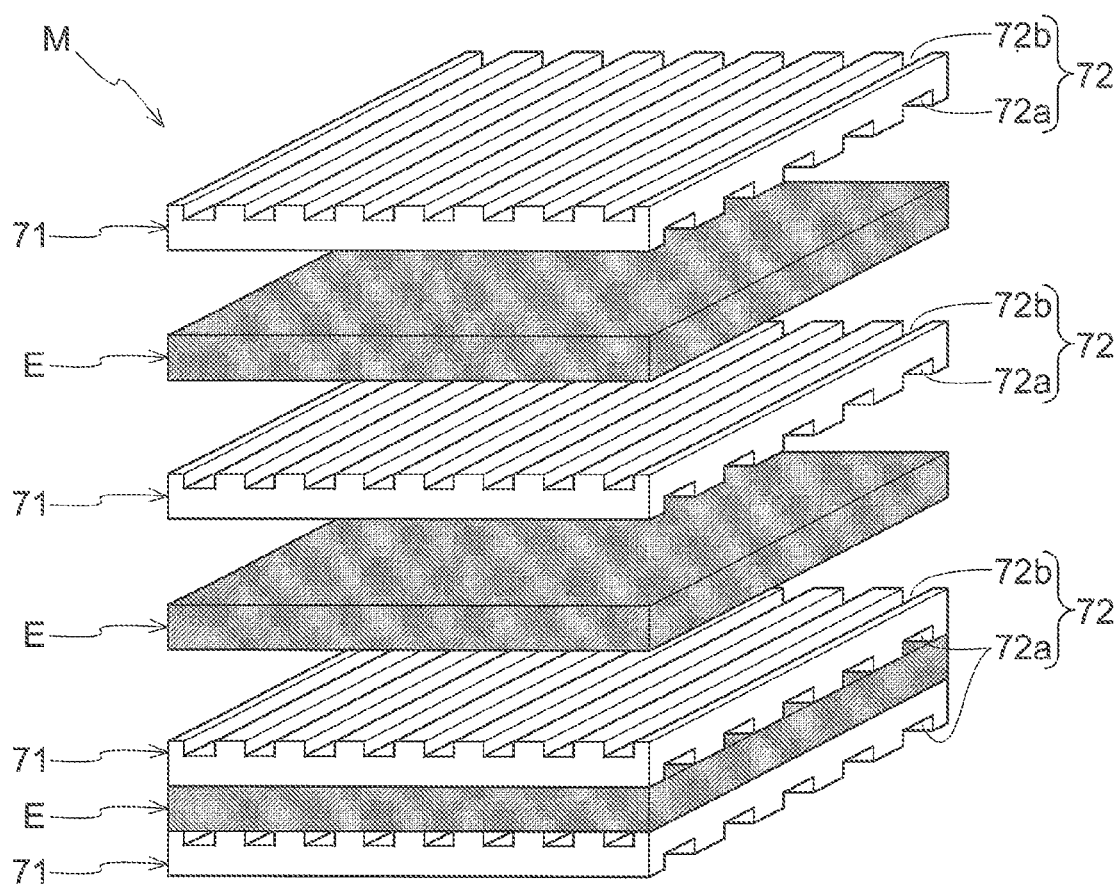
FIG. 4 is a schematic diagram showing a configuration of an electrochemical module.

FIG. 4 shows another embodiment of the electrochemical module M. The electrochemical module M according to this embodiment is configured by stacking the above-described electrochemical elements E with cell connecting components 71 being sandwiched therebetween.

The cell connecting components 71 are each a plate-shaped component that has electron conductivity and does not have gas permeability, and the upper surface and the lower surface are respectively provided with grooves 72 that are orthogonal to each other. The cell connecting components 71 can be formed using a metal such as stainless steel or a metal oxide. The above-mentioned alloy material is used for the cell connecting components 71 (interconnectors).

As shown in FIG. 4, when the electrochemical elements E are stacked with the cell connecting components 71 being sandwiched therebetween, a gas can be supplied to the electrochemical elements E through the grooves 72. Specifically, the grooves 72 on one side are first gas passages 72a and supply gas to the front side of one electrochemical element E, that is to say the counter electrode layer 6. The grooves 72 on the other side are second gas passages 72b and supply gas from the back side of one electrochemical element E, that is, the back side of the metal substrate 1, through the through holes 1a to the electrode layers 2.

In the case of operating this electrochemical module M as a fuel cell, oxygen is supplied to the first gas passages 72a, and hydrogen is supplied to the second gas passages 72b. Accordingly, a fuel cell reaction progresses in the electrochemical elements E, and electromotive force and electrical current are generated. The generated electrical power is extracted to the outside of the electrochemical module M from the cell connecting components 71 at the two ends of the stack of electrochemical elements E.

It should be noted that although the grooves 72 that are orthogonal to each other are respectively formed on the front surface and the back surface of each of the cell connecting components 71 in this embodiment, grooves 72 that are parallel to each other can be respectively formed on the front surface and the back surface of each of the cell connecting components 71.

OTHER EMBODIMENTS (1) Although the electrochemical elements E are used in a solid oxide fuel cell in the above-described embodiments, the electrochemical elements E can also be used in a solid oxide electrolytic cell, an oxygen sensor using a solid oxide, and the like. Moreover, the alloy material of the present invention can also be used in various devices in which volatilization of Cr from components needs to be suppressed, particularly various devices that are operated in a high-temperature range, other than the electrochemical element.

(2) Although the present application is applied to a metal-supported solid oxide fuel cell in which the metal substrate 1 serves as a support in the above-described embodiments, the present application can also be applied to an electrode-supported solid oxide fuel cell in which the electrode layer 2 or counter electrode layer 6 serves as a support, or an electrolyte-supported solid oxide fuel cell in which the electrolyte layer 4 serves as a support. In such cases, the functions of a support can be obtained by forming the electrode layer 2, counter electrode layer 6, or electrolyte layer 4 to have a required thickness.

(3) In the above-described embodiments, a composite material such as NiO-GDC, Ni-GDC, NiO-YSZ, Ni-YSZ, $CuO-CeO_2$, or $Cu-CeO_2$ is used as the material for forming the electrode layer 2, and a complex oxide such as LSCF or LSM is used as the material for forming the counter electrode layer 6. With this configuration, the electrode layer 2 serves as a fuel electrode (anode) when hydrogen gas is supplied thereto, and the counter electrode layer 6 serves as an air electrode (cathode) when air is supplied thereto, thus making it possible to use the electrochemical element E as a cell for a solid oxide fuel cell. It is also possible to change this configuration and thus configure an electrochemical element E such that the electrode layer 2 can be used as an air electrode and the counter electrode layer 6 can be used as a fuel electrode. That is, a complex oxide such as LSCF or LSM is used as the material for forming the electrode layer 2, and a composite material such as NiO-GDC, Ni-GDC, NiO-YSZ, Ni-YSZ, $CuO-CeO_2$, or $Cu-CeO_2$ is used as the material for forming the counter electrode layer 6. With this configuration, the electrode layer 2 serves as an air electrode when air is supplied thereto, and the counter electrode layer 6 serves as a fuel electrode when hydrogen gas is supplied thereto, thus making it possible to use the electrochemical element E as a cell for a solid oxide fuel cell.

It should be noted that the configurations disclosed in the above-described embodiments can be used in combination with configurations disclosed in other embodiments as long as they are compatible with each other. The embodiments disclosed in this specification are illustrative, and embodiments of the present invention are not limited thereto and can be modified as appropriate without departing from the object of the present invention.

INDUSTRIAL APPLICABILITY

The present invention can be applied to an electrochemical element and a cell for a solid oxide fuel cell.

LIST OF REFERENCE NUMERALS

1: Metal substrate (metal support, alloy material)
1a: Through hole
2: Electrode layer
3: Intermediate layer
4: Electrolyte layer
5: Reaction preventing layer
6: Counter electrode layer 7: U-shaped component (separator, alloy material)
17: Gas manifold (manifold, alloy material)
26: Current collector (alloy material)
31: Desulfurizer
32: Reformed water tank
33: Vaporizer
34: Reformer
35: Blower
36: Combustion unit
38: Inverter
39: Control unit
40: Storage container
41: Booster pump
42: Raw fuel supply passage
43: Reformed water pump
44: Reformed water supply passage
45: Vapor-containing raw fuel supply passage
46: Reformed gas supply passage
50: Combustion exhaust gas outlet
51: Combustion catalyst unit
52: Combustion exhaust gas discharge passage
53: Heat exchanger
71: Cell connecting component (interconnector, alloy material)
72: Groove
72a: First gas passage
72b: Second gas passage
E: Electrochemical element
M: Electrochemical module
y: Electrochemical device
Z: Energy system

The invention claimed is:

1. An alloy material comprising:
a substrate made of a Fe—Cr based alloy; and
a layer formed on/over the substrate,
wherein the Fe—Cr based alloy of the substrate contains Cu in an amount of 0.10 mass % or more and 1.0 mass % or less, Mn in an amount of 0.05 mass % or more, and Cr in an amount of 18 mass % or more and 25 mass % or less,
the layer includes a first layer and a second layer,
the first layer is formed on/over the substrate and is made of a metal oxide that contains Cr,
wherein the second layer is formed on/over the first layer as a metal oxide layer that contains more Co than the first layer does as measured by EPMA analysis, and
wherein the substrate contains more Co than the second layer does as measured by EPMA analysis.

2. The alloy material according to claim 1, wherein a Co-containing region is formed at a portion inside the substrate which portion faces an interface between the substrate and the layer.

3. The alloy material according to claim 1, wherein the second layer contains Mn.

* * * * *